(12) United States Patent
Cho et al.

(10) Patent No.: US 7,423,704 B2
(45) Date of Patent: Sep. 9, 2008

(54) LIQUID CRYSTAL DISPLAY MODULE

(75) Inventors: Jin-woo Cho, Seongnam-si (KR);
Seong-woon Booh, Yongin-si (KR);
Young-ki Kim, Hwaseong-si (KR);
Dong-woo Lee, Seoul (KR); Dong-ok Kwak, Suwon-si (KR); Ki-taek Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 11/123,200

(22) Filed: May 6, 2005

(65) Prior Publication Data

US 2005/0280750 A1 Dec. 22, 2005

(30) Foreign Application Priority Data

Jun. 21, 2004 (KR) ...................... 10-2004-0046139

(51) Int. Cl.
*G02F 1/1333* (2006.01)
*H04M 1/02* (2006.01)
(52) U.S. Cl. .................... 349/58; 455/575.3; 455/575.4

(58) Field of Classification Search .................... 349/58; 455/573.4, 575.4
See application file for complete search history.

(56) References Cited

U.S. PATENT DOCUMENTS

| 5,409,385 A * | 4/1995 | Tan et al. .................... 439/76.1 |
| 7,200,428 B2 * | 4/2007 | Taninai .................... 455/575.3 |
| 2003/0003962 A1 * | 1/2003 | Vooi-Kia et al. ............ 455/566 |

FOREIGN PATENT DOCUMENTS

| JP | 2002-93202 A | 3/2002 |
| JP | 2002-134946 A | 5/2002 |
| KR | 2002-0035294 A | 5/2002 |
| KR | 10-2004-0051378 A | 6/2004 |

OTHER PUBLICATIONS

Website. "Microplastic Inc.—What is Insert Molding?" http://www.microplasticsinc.com/what_is_insert_molding.htm. (c) 2002. Accessed May 22, 2007.*
Machine Translation of JP 2002-134946 A.*

* cited by examiner

*Primary Examiner*—David C. Nelms
*Assistant Examiner*—Matthew P Lawson
(74) *Attorney, Agent, or Firm*—Sughrue Mion, PLLC

(57) ABSTRACT

An LCD module is provided for use in a hand-held portable phone, which is eminently improved in impact-resistant property. The LCD module includes an LCD panel, a mold frame for receiving and supporting the LCD panel, and a chassis for reinforcing the rigidity of the mold frame, wherein the mold frame and the chassis are integrally insert-molded.

13 Claims, 8 Drawing Sheets

LIQUID CRYSTAL DISPLAY MODULE

CROSS-REFERENCE TO RELATED APPLICATION

This application claims the benefit of Korean Patent Application No. 2004-46139 filed Jun. 21, 2004, in the Korean Intellectual Property Office, the disclosure of which is incorporated herein by reference.

BACKGROUND OF THE INVENTION

1. Field of the Invention

The present invention relates to a liquid crystal display (LCD) module, which is a kind of display device and, in particular, to an LCD module for use in a hand-held mobile phone.

2. Description of the Related Art

With development of wireless communication technology, hand-held mobile phones have been miniaturized and complicated. Accordingly, hand-held mobile phones are required to have high reliability in mechanical characteristics as well as in electrical characteristics.

For this reason, LCD module manufacturers have recently devised a measure for enhancing the strength of mold frames for protecting LCD panels.

A measure most widely used to enhance the strength of a mold frame is to attach a bent metal sheet, which is formed by bending a metal sheet, to the mold frame. Such a sheet called as chassis is typically formed from stainless steel. Stainless steel is widely used because it has significantly higher strength than the plastic material forming such a mold frame. In particular, it is the actual circumstances that problems with a portable phone caused by a mistake such as dropping or stepping on such a portable phone are considered as a barometer for evaluating the performance of the portable phone.

Figure 1:
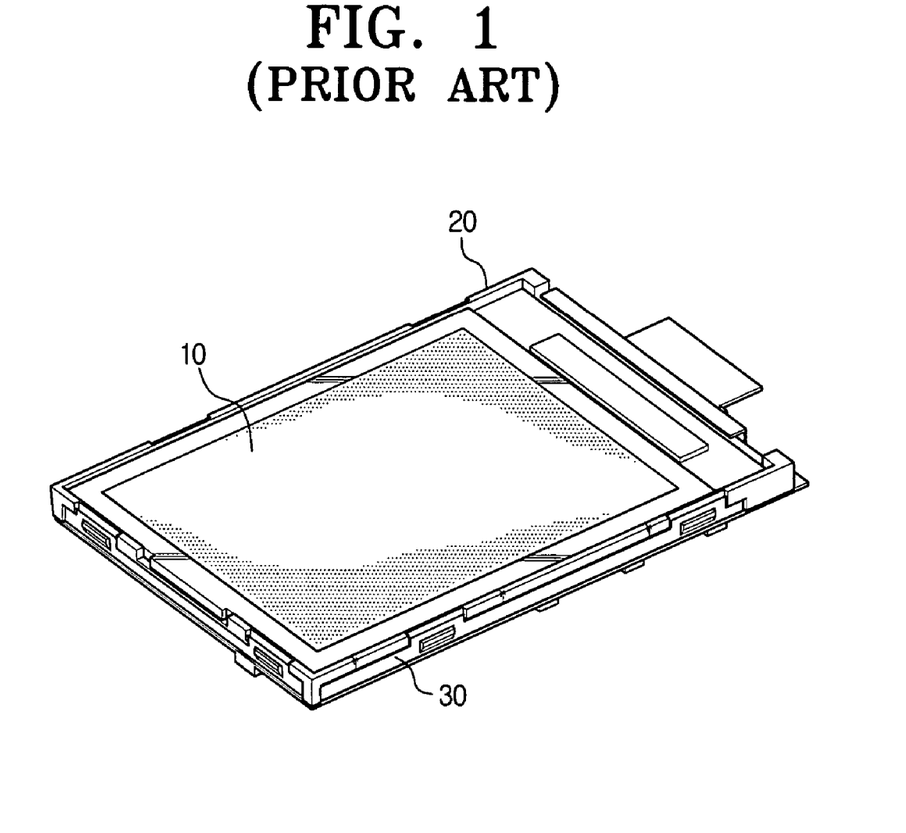
FIG. 1 is a perspective view a representative example of an LCD module for use in a hand-held portable phone.
Figure 2:
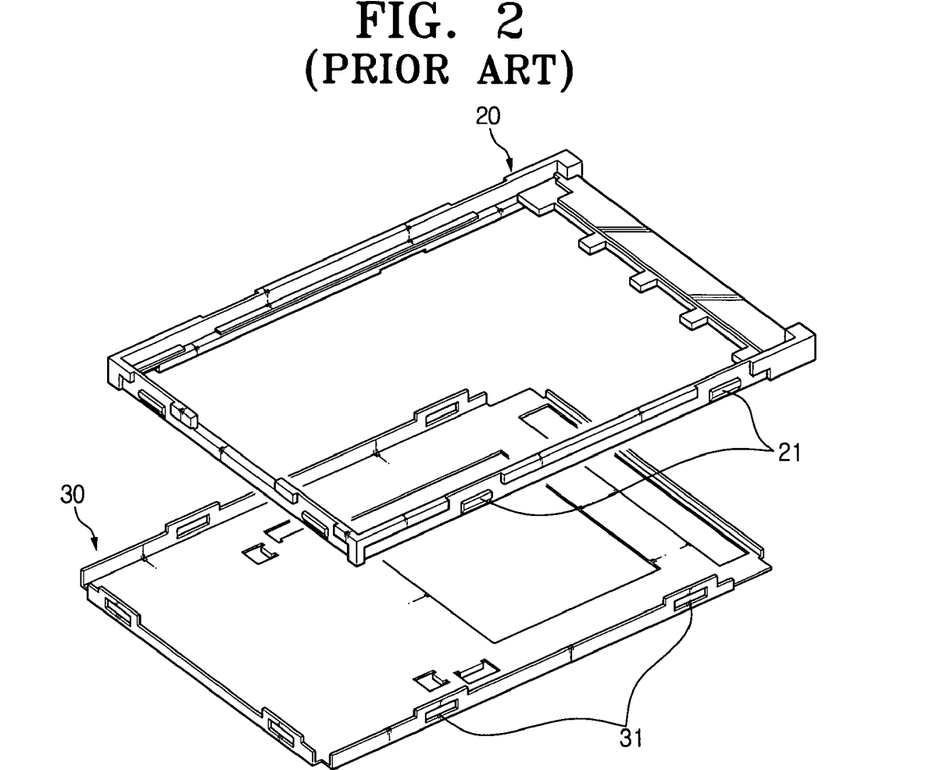
FIG. 2 is an exploded perspective view of a mold frame for use in the LCD module shown in FIG. 1.
Figure 3:
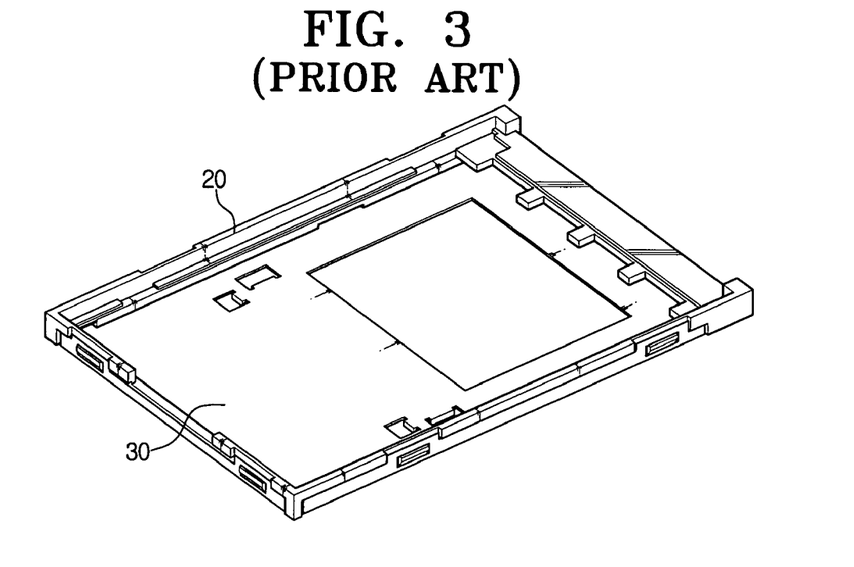
FIG. 3 is a perspective view showing the mold frame and the LCD module of FIG. 2 in an assembled state.
Figure 4:
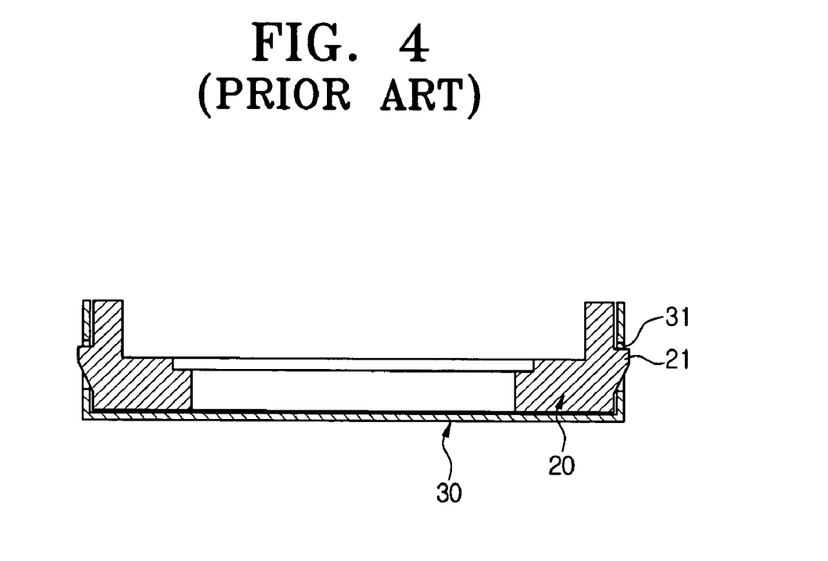
FIG. 4 is a cross-sectional view though a part of the assembly of FIG. 3.

FIG. 1 schematically shows an LCD module for use in a typical hand-held mobile phone, and FIGS. 2 to 4 show a mold frame structure for use in a typical hand-held mobile phone. Referring to these figures, reference numeral 10 indicates an LCD panel, reference numeral 20 indicates a mold frame, and reference numeral 30 indicates a chassis.

In FIG. 1, the LCD panel 10 is received in the mold frame 20 and the chassis 30 is assembled to the mold frame 20 to increase the rigidity of the mold frame 20.

In FIGS. 2 and 3, the mold frame 20 is fabricated by injection-molding a plastic material, in which plural assembling projections 21 are formed on the lateral sides of the mold frame 20. The chassis 30 is fabricated by bending the edges of a thin metal sheet, in which the bent edges are formed with plural assembling holes 31, into which the assembling projections 21 are respectively inserted.

The mold frame 20 and the chassis 30 are assembled with each other by hooking the assembling projections 21 in the assembling holes 31 as shown in FIGS. 2 and 3. Here, the chassis 30 is used for the purpose of reinforcement for enhancing the rigidity of the mold frame 20.

With a typical LCD module as described above, however, because the chassis 30 is assembled with the mold frame 20 by way of the hooking structure between the assembling projections 21 and the assembling holes 31, the mold frame 20 and the chassis 30 cannot be completely coupled to one another due to an assembling tolerance or the like. Consequently, there is a problem in that a rigidity increasing effect as desired cannot be obtained and thus the LCD panel 10 cannot be stably supported.

In order to solve such a problem, LCD modules of double chassis structure with a top chassis added beyond a bottom chassis have been developed. However, such a module has not been employed very much because the top chassis provides only a slight increase in structural strength as compared to increasing the thickness and mass of such an LCD module.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

Accordingly, the present invention has been conceived to solve the above-mentioned problems occurring in the prior art, and an aspect of the present invention is to provide an LCD module, in which the rigidity of a mold frame is enhanced without increasing thickness and weight, so that the impact-resistant property of the LCD module can be significantly enhanced.

Another object of the present invention is to provide a hand held portable phone employing an LCD module significantly improved in impact-resistant property as described above.

In order to achieve the above aspects, there is provided an LCD module comprising: an LCD panel; a mold frame for receiving and supporting the LCD panel; and a chassis for reinforcing the rigidity of the mold frame, wherein the mold frame and the chassis are integrally insert-molded.

According to an exemplary embodiment, the mold frame has four edges, and the chassis comprises four lateral sides corresponding to the four edges of the mold frame, wherein the mold frame and the chassis are insert-molded in such a manner that each lateral side of the chassis is positioned substantially at the center of the corresponding edge of the mold frame.

According to another exemplary embodiment of the present invention, the mold frame has four edges, and the chassis comprises four lateral sides corresponding to the four edges of the mold frame, wherein the mold frame and the chassis are insert-molded in such a manner that each lateral side of the chassis is in contact with the external surface of the corresponding edge of the mold frame.

Here, the chassis has a bottom, at the edges of which the four lateral sides are vertically formed by bending, respectively. Such a chassis is formed from a metallic material, such as, for example, stainless steel.

According to an exemplary embodiment of the present invention, the LCD module comprises an LCD panel; and a mold frame for receiving and supporting the LCD panel, the mold frame having four edges, wherein a chassis for reinforcing the rigidity of the mold frame is integrally insert-molded to the mold frame.

The chassis comprises four lateral sides each positioned substantially at the center of the corresponding edge of the mold frame. Here, the four lateral sides of the chassis may be configured to be in contact with the external surface of the corresponding edge of the mold frame. The chassis may be formed from stainless steel.

Meanwhile, in order to achieve the above aspects, there is also provided a hand-held portable phone comprising first and second body cases capable of being pivotally opened/closed, an information input device provided in one of the first and second body cases, and an LCD device provided in the other of the first and second body cases, wherein the LCD device comprises: an LCD panel; and a mold frame for receiving and supporting the LCD panel, the mold frame having four edges, wherein a chassis for reinforcing the rigidity of the mold frame is integrally insert-molded to the mold frame.

The chassis comprises four lateral sides, each being positioned substantially at the center of the corresponding edge of the mold frame.

In addition, the chassis has a bottom, at the edges of which the four lateral sides are vertically formed by bending, respectively. Moreover, the chassis may be formed from a stainless steel material.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE ILLUSTRATIVE, NON-LIMITING EMBODIMENTS OF THE INVENTION

Certain illustrative, non-limiting embodiments of the present invention will be described in greater detail with reference to the accompanying drawings.

In the following description, the same drawing reference numerals are used for the same elements even in different drawings. The matters defined in the description such as a detailed construction and elements are simply provided to assist in a comprehensive understanding of the invention. Thus, it is apparent that the present invention can be carried out without those defined matters. Also, well-known functions or constructions are not described in detail since they would obscure the invention in unnecessary detail.

As shown in FIGS. 5 to 8, an LCD module 100 according to an exemplary embodiment of the present invention com-prises an LCD panel 110, a mold frame 120, and a chassis 130, in which the mold frame 120 and the chassis 130 are insert-molded to form a single piece.

The mold frame 120 is formed from resin such as plastic and has four edges 121-124. In addition, the chassis 130 is formed from a metallic material, such as stainless steel, in which four lateral sides 131-134 are formed by vertically bending the edges of the bottom surface 135. That is, by bending the bottom surface 135 in this manner to form the lateral sides, the inner and outer surfaces of the lateral sides 131-134 are simply formed in a straight shape, with no projections, grooves or bending portions as found in the conventional devices (see FIG. 4).

Figure 5:
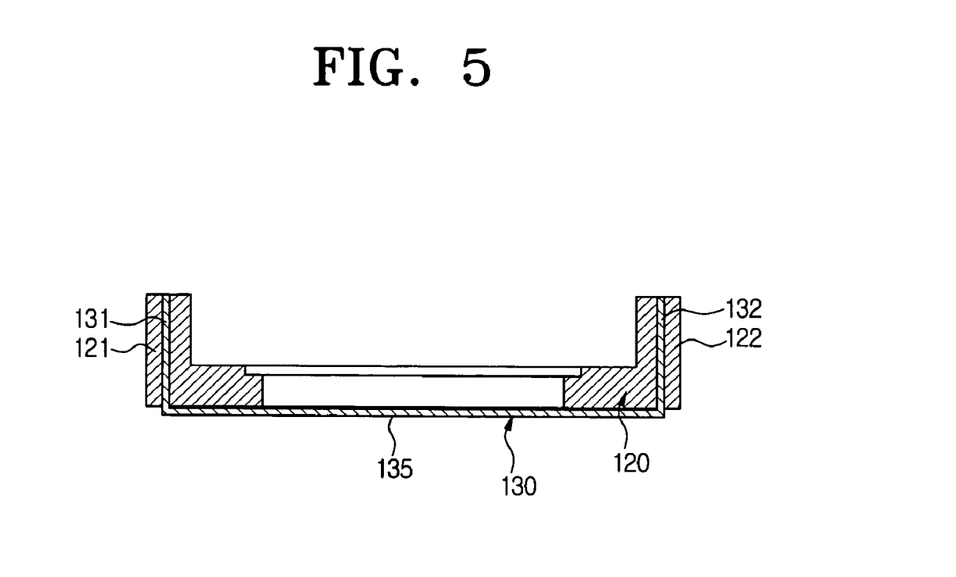
FIG. 5 is a cross-sectional view of a mold frame, which is a main part of an LCD module according to an exemplary embodiment of the present invention.
Figure 6:
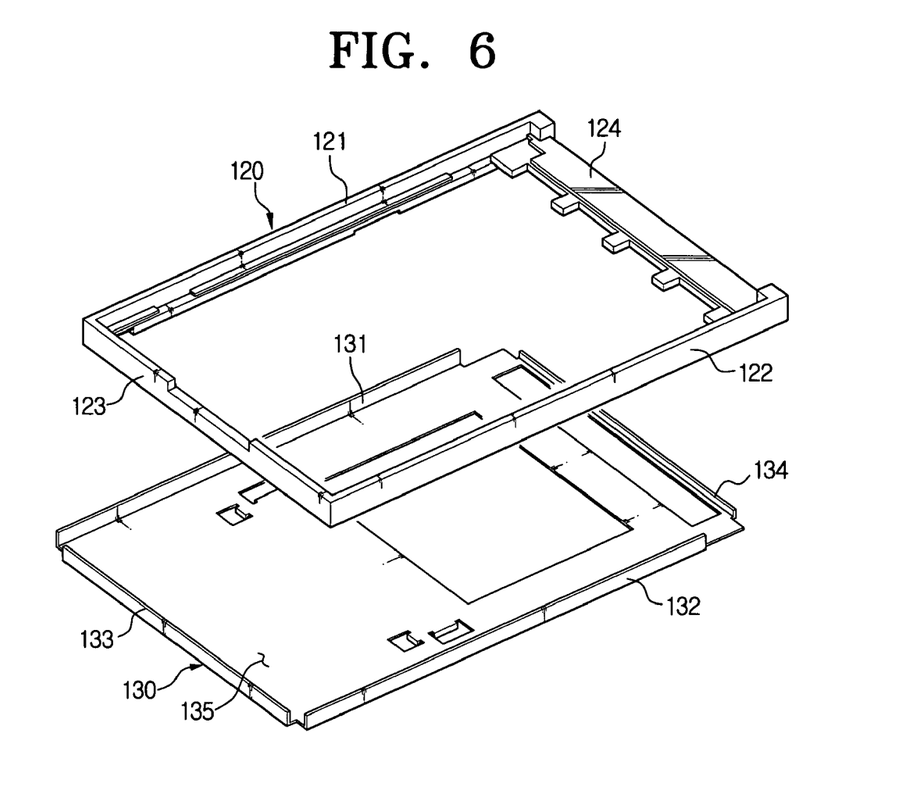
FIG. 6 is an exploded view of the mold frame shown in FIG. 5.
Figure 7:
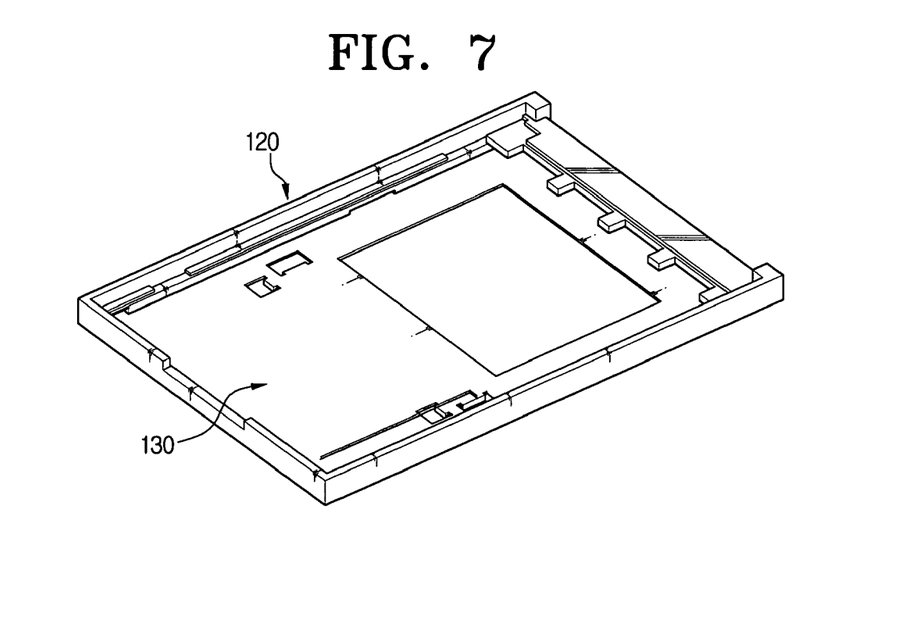
FIG. 7 is a perspective view showing the mold frame in an assembled state.
Figure 8:
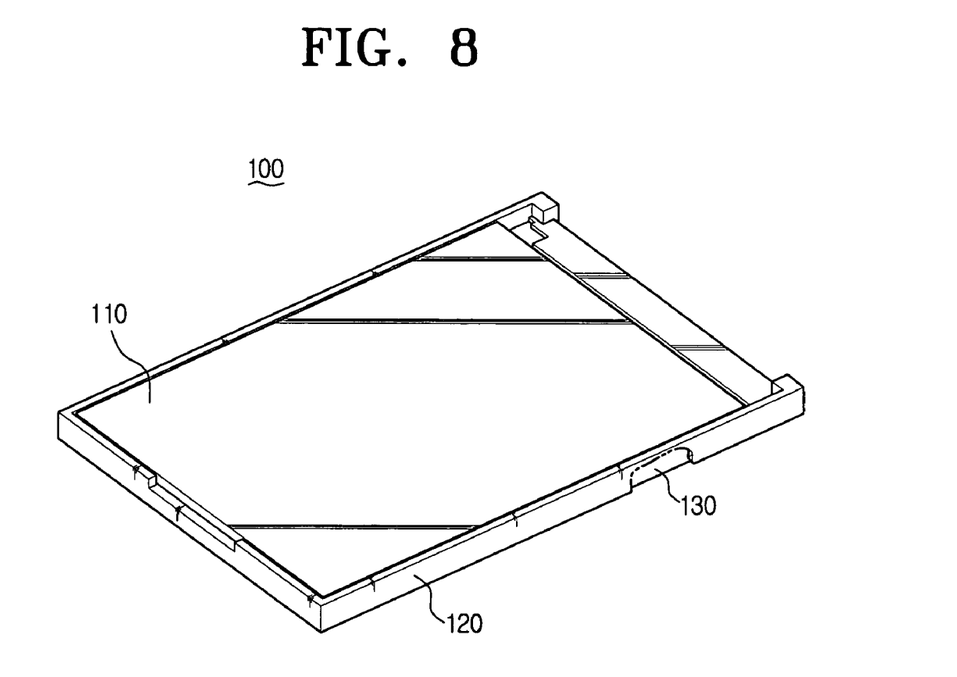
FIG. 8 is a perspective view showing an assembled state in which an LCD panel is assembled with the mold frame shown in FIG. 7.

The chassis 130 configured as described above is inserted into the mold frame 120 using an insert-molding process, in which the molding process is proceeded in such a manner that the four lateral sides 131-134 of the chassis 130 are positioned substantially at the centers of the edges 121-124 of the mold frame 120, respectively, whereby the entire rigidity of the mold frame 120 can be dramatically increased. As shown in FIG. 5, for example, an inner surface and an outer surface of each of the lateral sides 131-134 of the chassis 130 contact the corresponding edge of the mold frame 120, so that the sides are disposed within the edges. With this construction, the lateral sides are molded to the edges of the mold frame without the need of projections, grooves and bending portions to hold the chassis 130 and mold frame 120 together.

That is, in the past, a mold frame 20 and a chassis 30 have been separately fabricated and then assembled with each other by connecting assembling projections 21 and assembling holes 31, as shown in FIG. 4. However, because the mold frame 20 and the chassis 30 cannot be completely assembled with each other due to an assembling tolerance or the like, a rigidity increasing effect as required cannot be obtained. However, according to the present invention, the mold frame 120 and the chassis 130 are integrally formed as a single piece through an insert molding process, thereby enabling the rigidity of the mold frame to be eminently enhanced.

Figure 9A:
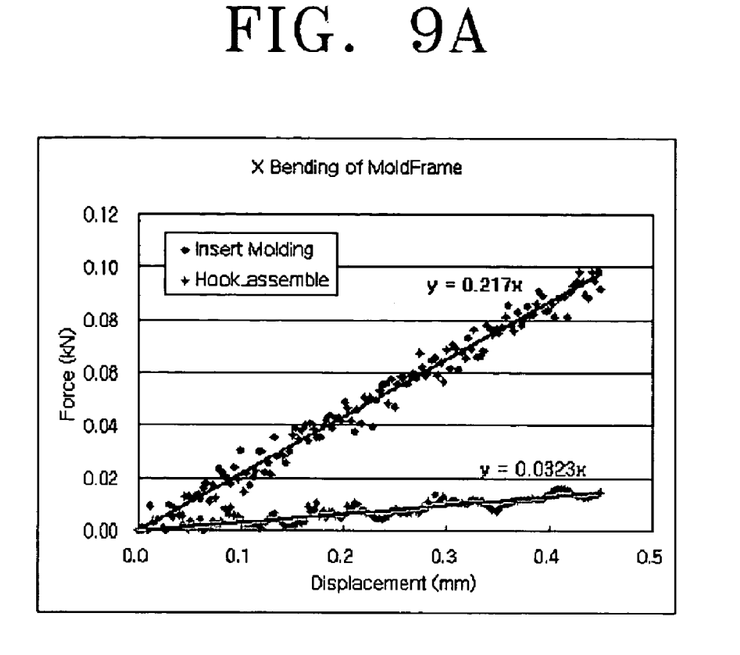
FIGS. 9A and 9B are graphs comparatively showing the rigidities of the inventive LCD module and a conventional LCD module.
Figure 9B:
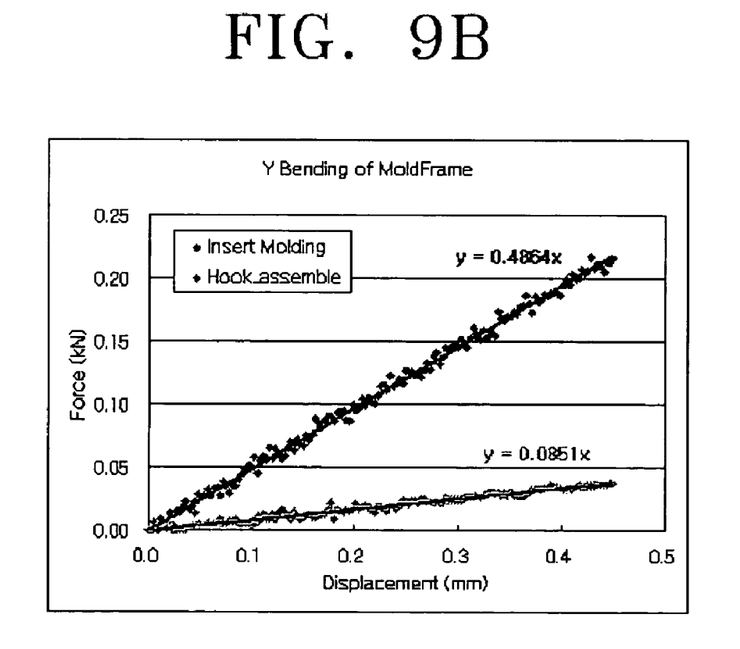

FIGS. 9A and 9B are graphs showing the results of comparatively analyzing the rigidities of the inventive LCD modules and conventional modules. In the analysis, LS-DYNA was used and three-axis bending phenomena caused by fixing opposite ends and compressing the center part of a module was analyzed. FIG. 9A shows the results of X bending and FIG. 9B shows the results of Y bending. As can be seen from the figures, the X bending analysis shows that the rigidity of the inventive module is higher than that of the conventional one by about seven times, and the Y bending analysis also shows that the rigidity of the inventive module is higher than that of the conventional one by about six times.

Accordingly, the inventive module can safely protect the LCD panel from impact or the like.

Figure 10:
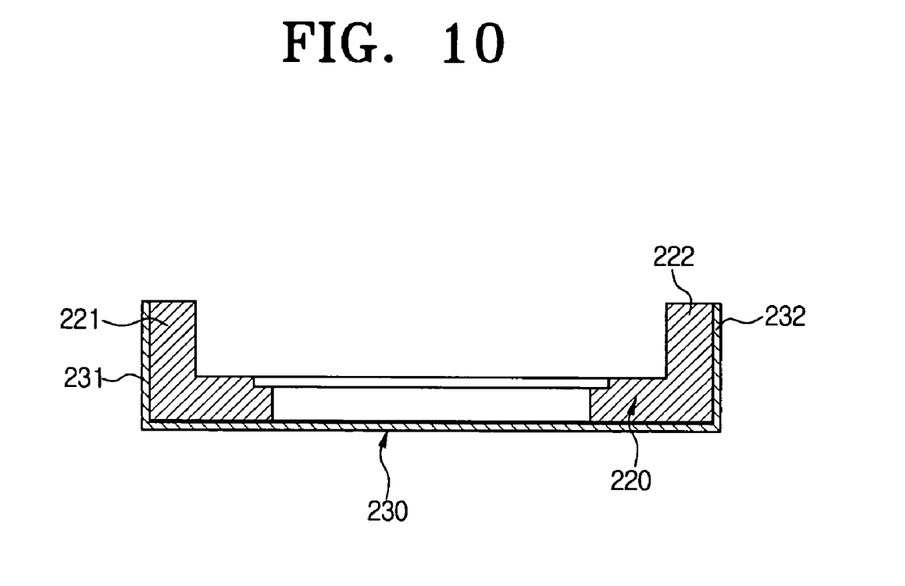
FIG. 10 is a cross-sectional view of a mold frame, which is a main part of an LCD module according to another exemplary embodiment of the present invention.

FIG. 10 shows a main construction of an LCD module according to another exemplary embodiment of the present invention. As shown in the figure, the present embodiment is the same with the embodiments described above, except that the four lateral sides 231, 232 (only the right and left sides are shown in the figure) are arranged to be in contact with the outer surfaces of the edges 221, 222 of the mold frame 220 when the mold frame 220 and the chassis 230 are integrally formed by insert-molding. According to this further exemplary embodiment, it is also possible to provide a mold frame having a significantly improved rigidity as compared to that of a conventional one, thereby enabling the LCD panel to be safely protected from impact.

Figure 11:
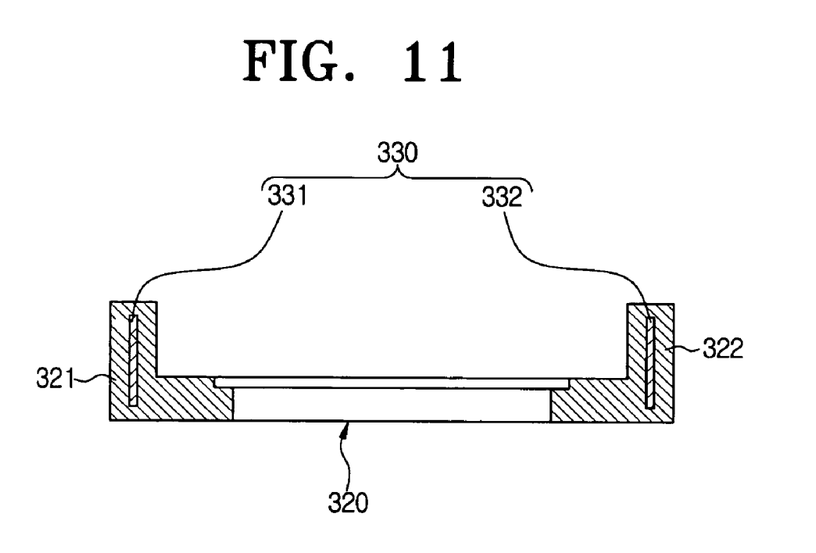
FIG. 11 is a cross-sectional view of a mold frame, which is a main part of an LCD module according to another exemplary embodiment of the present invention.

FIG. 11 is a cross-sectional view showing a main construction of an LCD module according to still another exemplary embodiment of the present invention. As shown in the figure, the present invention is characterized in that the chassis 330 housed within the edges 321, 322 of the mold frame 320 by insert molding has four lateral sides 331, 332 (only left and right sides are shown in the figure) but is not provided with a bottom. The other construction and functional effects are same with those of the previous exemplary embodiments. In this case, although the chassis 330 comprises four lateral sides without a bottom, it can provide a rigidity increasing effect identical to or even higher than those of the previous exemplary embodiments because the mass of the chassis 330 can be reduced as compared to the previous embodiments.

Figure 12:
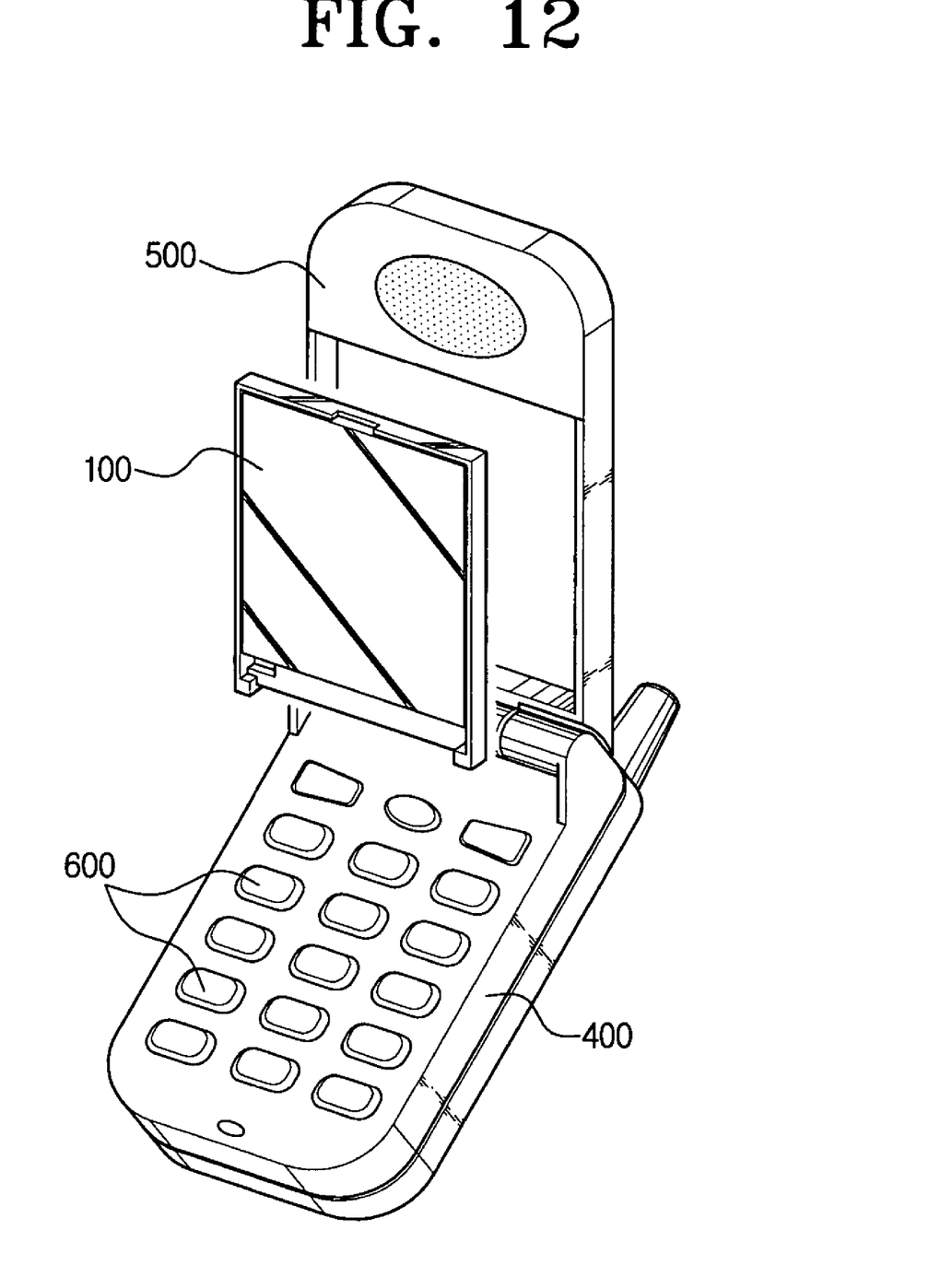
FIG. 12 is an exploded view schematically showing a folder type hand-held mobile phone, to which the inventive LCD module is applied.

FIG. 12 schematically shows an example of a hand-held portable phone, to which the inventive LCD module 100 with the above characteristics is applied. As shown in the figure, the portable phone comprises first and second body cases 400, 500 which can be pivotally opened or closed, wherein the first body case 400 is provided with an information inputting device 600 and the second body case 500 is provided with an LCD module 100.

In that event, because the LCD module 100 has a mold frame with an eminently increased rigidity as described above, the LCD panel can be safely protected from external impact or the like.

Accordingly, even if impact or external load caused by dropping or the like is applied to the LCD panel, the LCD panel can be prevented from being damaged, e.g., broken.

Although a folder type portable phone is shown and described, it is of course possible to apply the invention to an LCD module of a flip type or slide type portable phone. Beyond such a portable phone, the inventive LCD module can be effectively employed in any type of information, electric home appliances using an LCD module as a display device.

As described above, according to the present invention, because an LCD panel is supported by a chassis-integrated mold frame with an eminently improved rigidity, the LCD panel can be safely protected from external impact or load caused by dropping or the like. Therefore, the reliability of a hand-held portable phone or the like against impact is significantly improved, whereby the superiority in competition can be secured.

In addition, according to the present invention, because the mold frame and the chassis are integrally fabricated through an insert-molding process, it is possible to eliminate an assembling process of the mold frame and the chassis as required in the prior art. Therefore, improvements in assembly and productivity can be achieved.

While the exemplary embodiments of the present invention have been shown and described with reference to the representative embodiments thereof in order to exemplify the principle of the present invention, the present invention is not limited to these embodiments. It will be understood that various modifications and changes can be made by those skilled in the art without departing from the spirit and scope of the invention as defined by the appended claims. Therefore, it shall be considered that such modifications, changes and equivalents thereof are all included within the scope of the present invention.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A liquid crystal display (LCD) module comprising:
an LCD panel;
a mold frame for receiving and supporting the LCD panel; and
a chassis for reinforcing a rigidity of the mold frame, wherein the mold frame and the chassis are integrally insert-molded,
wherein the mold frame has four edges, and the chassis has four lateral sides corresponding to the four edges of the mold frame, and wherein the mold frame and the chassis are insert-molded in such a manner that each lateral side of the chassis is positioned within the corresponding edge of the mold frame so that an inner surface and an outer surface of each lateral side of the chassis is in contact with the corresponding edge of the mold frame so as to be positioned substantially at the center of the corresponding edge of the mold frame, and wherein the inner surface and the outer surface of each lateral side of the chassis is straight without any projections, grooves or bending potions formed therein.

2. The LCD module as claimed in claim 1, wherein the chassis has a bottom, at the edges of which the four lateral sides are vertically formed by bending, respectively.

3. The LCD module as claimed in claim 2, wherein the chassis is formed from a metallic material.

4. The LCD module as claimed in claim 2, wherein the chassis is formed from stainless steel.

5. A hand-held portable phone comprising first and second body cases capable of being pivotally opened/closed, an information input device provided in one of the first and second body cases, and a liquid crystal display (LCD) device provided in the other of the first and second body cases, wherein the LCD device comprises:
an LCD panel;
a mold frame for receiving and supporting the LCD panel, the mold frame having four edges; and
a chassis integrally insert-molded to the mold frame for reinforcing the rigidity of the mold frame,
wherein the chassis has four lateral sides corresponding to the four edges of the mold frame, and wherein the mold frame and the chassis are insert-molded in such a manner that each lateral side of the chassis is positioned within the corresponding edge of the mold frame so that an inner surface and an outer surface of each lateral side of the chassis is in contact with the corresponding edge of the mold frame so as to be positioned substantially at the center of the corresponding edge of the mold frame, and wherein the inner surface and the outer surface of each lateral side of the chassis is straight without any projections, grooves or bending portions formed therein.

6. The hand-held portable phone as claimed in claim 5, wherein the chassis has a bottom, at the edges of which the four lateral sides are vertically formed by bending, respectively.

7. The hand-held portable phone as claimed in claim 6, wherein the chassis is formed from stainless steel.

8. A hand-held portable phone comprising first and second body cases capable of being slidingly opened/closed, an information input device provided in one of the first and second body cases, and a liquid crystal display (LCD) device provided in the other of the first and second body cases, wherein the LCD device comprises:

an LCD panel;

a mold frame for receiving and supporting the LCD panel, the mold frame having four edges; and a chassis integrally insert-molded to the mold frame for reinforcing the rigidity of the mold frame, wherein the chassis has four lateral sides corresponding to the four edges of the mold frame, and wherein the mold frame and the chassis are insert-molded in such a manner that each lateral side of the chassis is positioned within the corresponding edge of the mold frame so that an inner surface and an outer surface of each lateral side of the chassis is in contact with the corresponding edge of the mold frame so as to be positioned substantially at the center of the corresponding edge of the mold frame, and wherein the inner surface and the outer surface of each lateral side of the chassis is straight without any projections, grooves or bending portions formed therein.

9. The hand-held portable phone as claimed in claim 8, wherein the chassis has a bottom, at the edges of which the four lateral sides are vertically formed by bending, respectively.

10. The hand-held portable phone as claimed in claim 9, wherein the chassis is formed from stainless steel.

11. A hand-held portable phone comprising a body case, an information input device provided in a lower side of the body case, and a liquid crystal display (LCD) device provided in an upper side of the body case, wherein the LCD device comprises:

an LCD panel;

a mold frame for receiving and supporting the LCD panel, the mold frame having four edges; and a chassis integrally insert-molded to the mold frame for reinforcing the rigidity of the mold frame, wherein the chassis has four lateral sides corresponding to the four edges of the mold frame, and wherein the mold frame and the chassis are insert-molded in such a manner that each lateral side of the chassis is positioned within the corresponding edge of the mold frame so that an inner surface and an outer surface of each lateral side of the chassis is in contact with the corresponding edge of the mold frame so as to be positioned substantially at the center of the corresponding edge of the mold frame, and wherein the inner surface and the outer surface of each lateral side of the chassis is straight without any projections, grooves or bending positions formed therein.

12. The hand-held portable phone as claimed in claim 11, wherein the chassis has a bottom, at the edges of which the four lateral sides are vertically formed by bending, respectively.

13. The hand-held portable phone as claimed in claim 12, wherein the chassis is formed from stainless steel.

* * * * *